United States Patent [19]
Schumacher et al.

[11] Patent Number: 5,518,029
[45] Date of Patent: May 21, 1996

[54] ELECTROMAGNETIC VALVE, IN PARTICULAR SWITCHING VALVE FOR AUTOMATIC TRANSMISSIONS OF MOTOR VEHICLES

[75] Inventors: Steffen Schumacher, Renningen; Kurt Gensheimer, Bad Liegenzell, both of Germany

[73] Assignee: Robert Bosch GmbH, Stuttgart, Germany

[21] Appl. No.: 289,757

[22] Filed: Aug. 12, 1994

[30] Foreign Application Priority Data

Sep. 28, 1993 [DE] Germany .................. 43 32 948.90

[51] Int. Cl.$^6$ .................. F15B 3/044; F16K 31/06
[52] U.S. Cl. .................. 137/625.65; 251/129.16; 251/129.21
[58] Field of Search ................ 137/625.65; 251/129.16, 251/129.21

[56] References Cited

U.S. PATENT DOCUMENTS

| 4,005,733 | 2/1977 | Riddel | 137/625.65 X |
| 4,720,078 | 1/1988 | Nakamura et al. | 251/129.21 X |
| 4,753,416 | 6/1988 | Inagaki et al. | 137/625.65 X |
| 4,763,635 | 8/1988 | Ballhause et al. | 251/129.16 X |
| 5,076,323 | 12/1991 | Schudt | 251/129.21 X |
| 5,358,215 | 10/1994 | Buth et al. | 251/129.21 |

FOREIGN PATENT DOCUMENTS

| 1930447 | 1/1970 | Germany | 137/625.65 |
| 4026231 | 2/1992 | Germany | 137/625.65 |
| 4111987 | 10/1992 | Germany | 137/625.65 |
| 4301670 | 7/1994 | Germany . | |

*Primary Examiner*—Gerald A. Michalsky
*Attorney, Agent, or Firm*—Michael J. Striker

[57] ABSTRACT

An electromagnetic valve, in particular a switching valve for automatic transmissions for motor vehicles has a magnet housing, a synthetic plastic body in which the magnet housing is always partially embedded, a magnet coil and a magnet core received in the magnet housing, a magnet armature, a valve member with which the magnet core cooperates through the magnet armature, and a valve closing part provided with pressure medium passages and having a connecting flange, the synthetic plastic body having an edge which surrounds the magnet housing and extends outwardly beyond it, the circumferential edge of the synthetic plastic body surrounding the connecting flange of the valve closing part, the synthetic plastic body and the connecting flange being connected in the region of their adjoining circumferential surfaces.

4 Claims, 1 Drawing Sheet

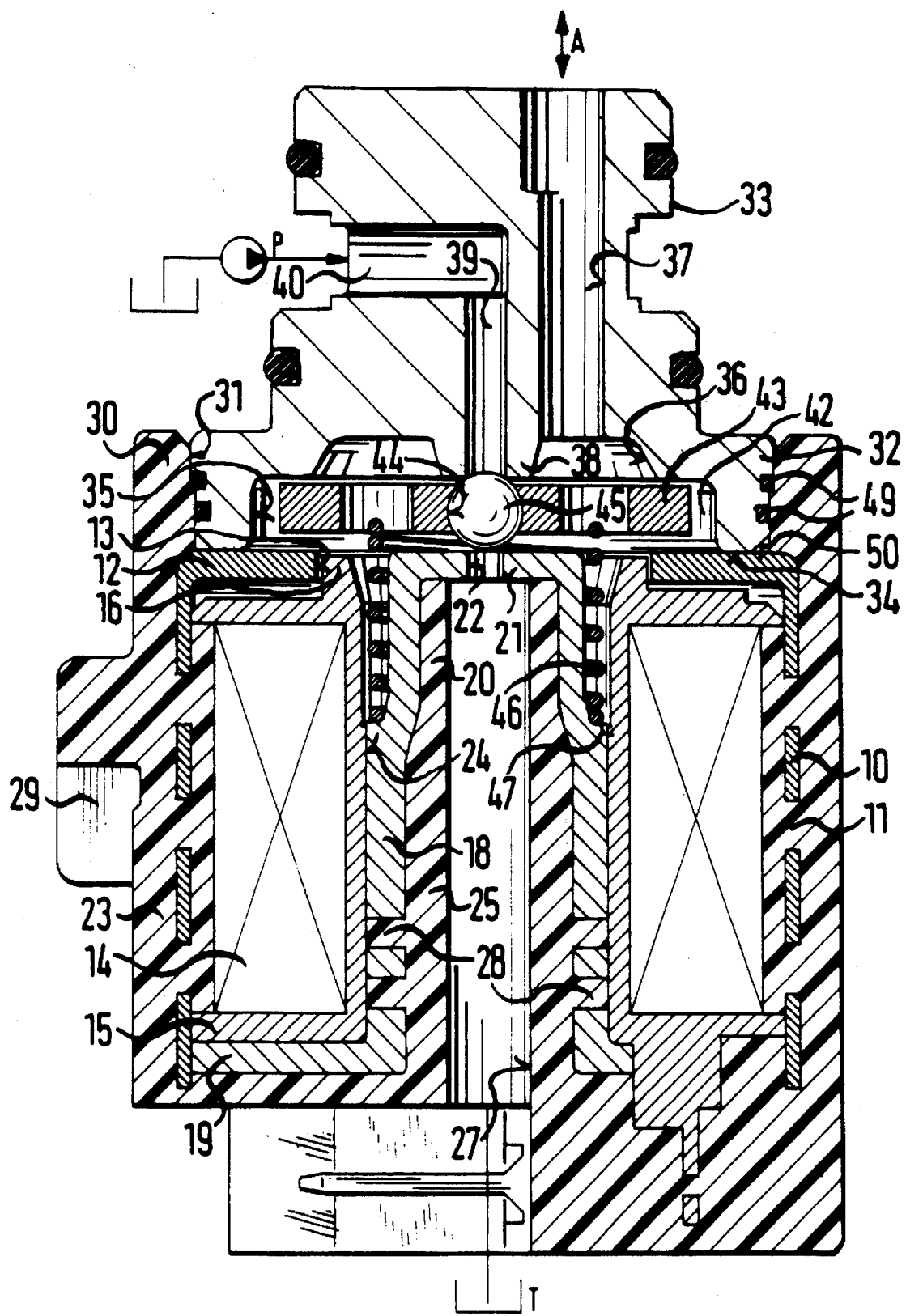

ELECTROMAGNETIC VALVE, IN PARTICULAR SWITCHING VALVE FOR AUTOMATIC TRANSMISSIONS OF MOTOR VEHICLES

BACKGROUND OF THE INVENTION

The present invention relates to an electromagnetic valve and in particular a switching valve for automatic transmissions of motor vehicles.

Electromagnetic valves of the above mentioned general type are known in the art. One of such electromagnetic valves is disclosed for example in the published German document DE-OS 43 01 670. In electromagnetic valves of this type the connection of the valve closing part and the magnet housing is performed by a flanging process, in which the parts of the magnetic casing are bent around the connecting flange of the valve closing part. The magnetic housing which is usually made as a part produced by turning of deep drawing, is always designed so that a flange collar is formed on the open housing side. Moreover, during the operation of the electromagnetic valve difficulties occur which are caused by the flanging process. On the one hand during the flanging or in other words during bending of the metallic magnet housing chip formation can occur and the chips can reach the pressure medium circulation. Furthermore, such flange connections in some cases lead to untightness which can be disturbing during the operation of the electromagnetic valve and can lead to their failure. Due to the strong deformation of the metallic magnet housing, cracks can occur in the region of the flange connection.

SUMMARY OF THE INVENTION

Accordingly, it is an object of the present invention to provide an electromagnetic valve, in particular switching valve for automatic transmissions of motor vehicles, which avoids the disadvantages of the prior art.

In keeping with these objects and with others which will become apparent hereinafter, one feature of the present invention resides, briefly stated, in an electromagnetic valve having a magnet housing which is at least partially embedded in a synthetic plastic body and receives a magnet coil and a magnet core cooperating through a magnet armature with valve member, and also has a valve closing part with pressure medium passages, wherein in accordance with the present invention the synthetic plastic body has an edge which surrounds the magnet housing and extends beyond it and which extends around a connecting flange of the valve closing part, and the circumferential edge of the synthetic plastic body and the connecting flange are connected with one another in the region of their adjoining circumferential surfaces.

When the electromagnetic valve is designed in accordance with the present invention, it avoids the disadvantages of the prior art. More particularly, the connection of the magnetic housing in the valve closing part is performed in a cost favorable and a simple manufacturing manner without the deformation of the magnetic housing. A flanging collar is not required. The connection between the valve closing member and the magnetic housing is performed through the synthetic plastic body in which the magnet housing is embedded, and can be performed by cost favorable, manufacturing technique which is simple and involves automatic processes such as ultrasound welding, ultrasound embedding or glueing.

For providing a good and durable connection of the valve closing part with the magnet housing core of the synthetic plastic body, it is advantageous when the connecting flange is substantially circular cylindrical, since in this case a uniform clamping process in the connecting region is possible.

When the connecting flange of the valve closing part or the whole valve closing part is composed of a thermoplastic synthetic material, it is produced simple and cost favorable, and the connection with the synthetic plastic body of the magnet housing is especially efficient by ultrasound welding.

During the ultrasound welding embedding it is advantageous when depressions are formed in the outer periphery of the connecting flange, in which the material of the synthetic plastic body to be embedded in ultrasound can penetrate. Therefore, a firm connection (form-locking connection) is guaranteed. In this case the connecting flange or the whole valve closing part can be composed of a metallic material for example aluminum.

It is especially advantageous when the magnet core as well as the magnet housing are formed as a deep-drawn metal part, since the deep-drawn metal parts can be produced simpler and more cost-economical than the same parts produced by turning. Moreover, additional air gap which disturbs the magnetic flux is dispensed with when instead of two parts only one part is utilized.

In particular, when the magnet core is hollow cylindrical and coated on its inner side with synthetic plastic material connected with the synthetic plastic body, leakages of the pressure medium along the contact points are completely avoided. The pressure medium can no longer penetrate, as in the conventional electromagnetic valves, through a gap between the magnet core and the core body. With a magnet core composed of a deep-drawn metal part it is especially advantageous when a bottom element of the magnet housing is molded with it. Thereby the mounting of the electromagnetic valve is simplified and the construction is more cost economical.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view showing a longitudinal section of the electromagnetic valve in accordance with the present invention.

DESCRIPTION OF THE PREFERRED EMBODIMENTS

An electromagnetic valve in accordance with the present invention has a magnet housing which is identified with reference numeral 10 and is substantially cup-shaped. A plurality of throughgoing passages 11 are provided on its periphery. A central opening 13 is formed in the bottom 12 of the magnet housing 10. A magnet coil 14 together with coil body 15 are arranged in the interior of the magnet housing 10. The coil body 15 is provided on its end side with a ring-shaped projection 16 extending into the opening 13 of the bottom 12. The magnet coil 14 or the coil body 15 surround a hollow cylindrical magnet core 18 provided on its lower end side with an outwardly extending bottom element 19. The bottom element 19 closes the open side of the magnet housing 10. The magnet core 18 has a portion 20 of smaller diameter in the region facing the bottom 12. The portion 20 extends up to the opening 13. The portion 20 of smaller diameter of the magnet core 18 is closed in the region of the opening 13 by a cover 21 with a throughgoing opening 22.

The magnet housing 10 with the bottom 12 and the magnet core 18 with the cover 21 and the bottom element 19 are made as simple and price favorable deep-drawn parts. For connecting the magnet housing 10, the magnet core 18 together with the bottom element 19, and the magnet coil 14 as well as the coil body 15, they are embedded in a synthetic plastic body 23. The embedding process is performed in a known manner by inserting the above described parts into an injection mold and injecting a plastic injection material. Due to the throughgoing passages 11 and the magnet housing 10 a firm and heat conductive connection to the magnet coil 14 is provided. The magnet core 18 is coated in the region of its inner chamber 24 also with a synthetic plastic mass 25, and a throughgoing pressure medium passage 27 connected with an opening 22 in the cover 21 is retained. A connection to the magnet coil 14 or to the coil body 15 is performed through the passages 28 in the magnet core 18, so that a tight embedding or connection to the synthetic plastic mass 25 is possible. The synthetic plastic mass 25 in the interior of the magnet core 18 is connected with the synthetic plastic body 23 and the bottom element 19 is embedded as well.

The synthetic plastic body 23 in the region of the bottom 12 of the magnet housing 10 has a projecting, circumferential edge 30. The circumferential edge 30 of the synthetic plastic body 23 forms a substantially cylindrical chamber 31 outside the outer side of the bottom 12. A mounting element 29 for the mounting of the magnetic valve is formed on the synthetic plastic body 23.

The substantially circular cylindrical connecting flange 32 of a valve closing part 33 is inserted in the space 31 inside the circumferential edge 30 of the synthetic plastic body 23, so that its end side 34 can abut against the bottom 12.

A substantially circular cylindrical depression 35 is formed in the end side 34 of the connecting flange 32 which faces the bottom 12. A ring groove 36 extends from its base. It is connected with a consumer through a longitudinal passage 37 extending through the valve closing part 33, and the consumer connection is identified with A. The projection 38 enclosed by the ring groove 36 is provided with a longitudinal opening 39 which is located opposite to the opening 22 in the magnet core 18 and connected with a transverse passage 40 in the valve closing part 33. The transverse passage 40 communicates with the pressure medium source and its connection is identified as P.

The chamber enclosed by the depression 35 in the connecting flange 32 and the bottom 12 operates as an armature chamber 42 in which a disc-shaped magnet armature 43 is guided. The magnet armature 43 has a central opening 44, and a spherical valve member 45 is pressed in it. The valve member 45 cooperates with the opening 39 in the valve closing part 33 or the opening 22 in the magnet core 18. The ends of the opening 39 or 22 provided in the armature chamber 42 are formed as valve seats.

The magnet armature 43 is loaded at its end side facing the magnet coil 14 with a spring 46. The spring surrounds the portion 20 of the smaller diameter of the magnet core 18 and abuts against the step 47 formed by the transition to the greater outer diameter. The spring 46 presses the magnet armature in direction to the valve closing part 33, so that the valve member 45 abuts against the valve seat in the longitudinal opening 39.

The valve closing member 33 and the magnet housing 10 are connected with one another through the synthetic plastic body 23. For this purpose the adjoining circumferential surfaces of the connecting flange 32 and the circumferential edge 30 of the synthetic plastic body 23 are firmly connected with one another in a known manner, for example by ultrasound welding, ultrasound embedding, or glueing.

When in particular the valve closing part 33 or at least its connecting flange 32 is composed of a thermoplastic synthetic material, a connection with the edge 30 can be formed by ultrasound welding in a favorable manner.

A connection is however also possible when the valve closing part 33 or the connecting flange 32 is composed of other materials, such as for example aluminum or other metals. For providing in this case a good and durable connection by ultrasound embedding, ring-shaped grooves 49 are formed on the outer periphery of the connecting flange 32 and their volume is substantially smaller than the volume melted during embedding.

The grooves are radially stepped so that first the lower groove with the smaller diameter and then the groove with the greater diameter are filled. During ultrasound embedding the synthetic plastic body 23 or the circumferential edge 30 can be embedded in these grooves, so that a durable and high-strength connection is produced. It is desirable to form on the connecting flange 32 a circumferential incline 50 extending from the end side 34 to the outer periphery, for preventing penetration of the synthetic plastic melt between connecting flange 32 and bottom 12 and centering the flange.

The above described electromagnetic valve is formed as a ⅔ valve. Its operation is known per se and therefore not described in detail.

Due to the above described construction of the magnet housing 10 and the synthetic plastic body 23, a simple and cost favorable mounting of an electromagnetic valve is possible. In view of the construction of the housing, a modular assembly of an electromagnetic valve is possible. For example by exchanging the valve closing part and/or the magnet armature parts group, a changed construction of the valve and a different valve operation is possible.

Due to the above described construction of the circumferential edge 30 of the synthetic plastic body 23 a substantial advantage is provided in view of an unloading of the connecting point between the magnet housing 10 and the valve closing part 33. In the assembled condition of the electromagnetic valve when it is used for example as a switching valve in an automatic transmission of a motor vehicle, the valve With its valve closing part 33 is inserted in a corresponding receiving opening and held by interengagement of the mounting portion 29 by a not shown mounting spring. The clamping force and/or vibration loads applied thereby eccentrically can be supported on the end side of the circumferential edge. Thereby the connecting point between the connecting flange.32 and the circumferential edge 30 is unloaded. In conventional electromagnetic valves of this type the support is performed on the connecting flange, since in the flange region of the magnet housing no definite support is possible.

The formation of the magnet housing 10 and the magnet core 18 as a deep-drawn metal part or a punched drawn part leads to considerable cost saving when compared with a formation of the same as a part produced by turning. Due to this formation a manufacture without chip removal is possible, so that an eventual operation-endangering chip yield during formation of the opening extending through the magnet core is dispensed with.

In the conventional electromagnetic valve of this type leakage occurs partially between the coil body and the magnet core. In the inventive electromagnetic valve it is eliminated by the above described embedding in the synthetic plastic body 23 and the synthetic plastic mass applied on the inner side of the magnet core 18.

In conventional electromagnetic valves of this type due to the above described formation of the flange edge an additional flux conducting element is required for providing a magnetic return flux. In the inventive electromagnetic valve this function is performed by the bottom 12 of the magnet housing 10, and due to the one-piece construction a substantial simplification of the handling is obtained. The magnetic efficiency of the electromagnetic valve is increased since there are no magnetic losses in air gaps between the two-part housing construction. Moreover, in conventional electromagnetic valves the abutment of the flux conducting element against a magnet housing is often inaccurate. During flanging of the magnet housing, displacements, bending (setting) and thereby stroke changes are possible. In the inventive electromagnetic valve and due to the abutment of the connecting flange 32 in the bottom 12, a definite spatial association is provided which does not change during the connecting process. Thereby a high quality with accurate and constant sizes is guaranteed in particular in the mass production of electromagnetic valves.

It will be understood that each of the elements described above, or two or more together, may also find a useful application in other types of constructions differing from the types described above.

While the invention has been illustrated and described as embodied in an electromagnetic valve, in particular switching valve for automatic transmissions for motor vehicles, it is not intended to be limited to the details shown, since various modifications and structural changes .lay be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electromagnetic valve for automatic transmissions for motor vehicles, comprising a magnet housing; a synthetic plastic body in which said magnet housing is always partially embedded; a magnet coil and a magnet core received in said magnet housing; a magnet armature; a valve member with which said magnet core cooperates through said magnet armature; and a valve closing part provided with pressure medium passages and having a connecting flange, said synthetic plastic body having an edge which surrounds said magnet housing and extends outwardly beyond it, said edge of said synthetic plastic body surrounding said connecting flange of said valve closing part, said synthetic plastic body and said connecting flange being connected in a region of their adjoining circumferential surfaces, said connecting flange being composed of a metal material and connected with said circumferential edge by ultrasound embedding, said connecting flange having an outer periphery provided with a plurality of depressions.

2. An electromagnetic valve as defined in claim 1, wherein said magnetic core is formed as a deep-drawn metal part.

3. An electromagnetic valve as defined in claim 1, wherein said magnet core is hollow cylindrical and has an inner side covered at least partially with a synthetic plastic mass connected with said synthetic plastic body of said magnet housing.

4. An electromagnetic valve as defined in claim 1, wherein said magnet core at its side facing away from said magnet armature is provided with a bottom element.

* * * * *